UNITED STATES PATENT OFFICE 2,579,163

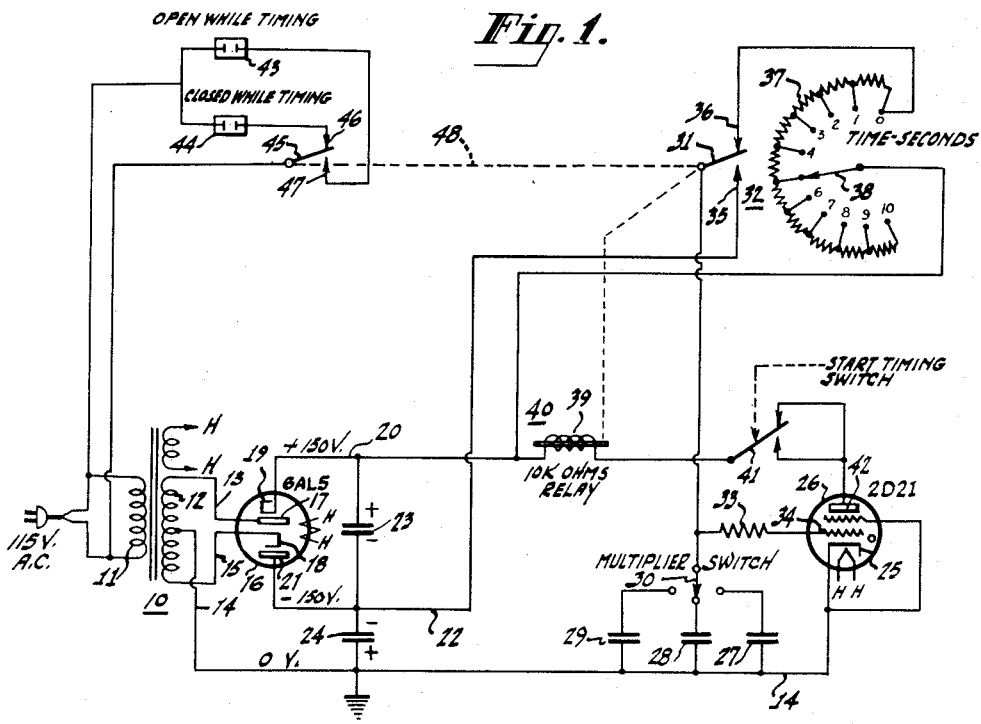

ELECTRONIC TIMING DEVICE

Sidney Wald, Collingswood, N. J., and John S. Russo, Philadelphia, Pa., assignors to Radio Corporation of America, a corporation of Delaware Application December 26, 1947, Serial No. 794,078

12 Claims. (Cl. 175—320)

This invention relates to electronic timing devices which are adapted to maintain a desired condition of a load device during a time interval which may be pre-set to a predetermined value.

In various types of operations, it is desirable that such a timing device be operable to provide a time interval which is highly accurate and independent of variation in the voltage of the line from which it is energized. The present invention achieves this result by means including a capacitor which (1) normally is charged to a high negative potential, (2) is discharged through a resistor of known value to zero potential, and (3) is charged to a positive potential of the same value as such negative potential. The capacitor is connected in the control grid circuit of a gaseous conduction device so that this device starts to conduct when the potential of the capacitor becomes equal to its critical grid potential which is approximately zero.

Thus there is established a time interval which (1) starts when the capacitor starts to discharge through the resistor, (2) ends when the potential of the capacitor changes to the critical control grid voltage of the gaseous conduction device, and (3) is independent of line voltage because the discharge curve of the capacitor always crosses zero voltage at a steep angle and the time required for the capacitor voltage to reach its zero value is independent of the total available voltage.

The principal object of the invention is to provide an improved timing device and method of operation whereby there is provided a time interval which is unaffected by variation in the voltage of the supply line from which the device is energized. Additional objects of the invention are the provision of a timing device which is capable of having its time interval adjusted over a predetermined range by successive and equal steps, and the provision of a timing device which may be operated to cover a plurality of different ranges of time intervals.

The invention will be better understood from the following description considered in connection with the accompanying drawings and its scope is indicated by the appended claims.

Referring to the drawings:

Fig. 1 is a wiring diagram of a preferred embodiment of the invention, and

Fig. 2 is an explanatory diagram relating to the operation of the timing device illustrated by Fig. 1.

The timing device of Fig. 1 includes a power input transformer 10 having a primary winding 11 and a secondary winding 12 which is provided with terminals 13, 14 and 15.

A duodiode 16, which may be of the 6AL5 type, has one anode 17 connected to the secondary lead 13 and one cathode 18 connected to the secondary lead 15. A second cathode 19, which cooperates with the anode 17, is connected to a lead 20. A second anode 21, which cooperates with the cathode 18 is connected to a lead 22. Electrolytic capacitors 23 and 24, each of 10 microfarads capacity, are connected respectively between the leads 20 and 22 and between the lead 22 and the lead 14 which is grounded so as to be maintained at zero potential. Under these conditions, the leads 20 and 22 have potentials which are of equal value and are of opposite polarity. This follows from the fact that capacitor 23 will be charged to the full secondary voltage while capacitor 24 will be charged to one-half the secondary voltage.

The grounded lead 14 is connected to the cathode 25 of a gaseous conduction device or thyratron 26 and to the zero potential terminals of a plurality of capacitors 27, 28 and 29 which may have capacities of 0.04 microfarad, 0.4 microfarad and 4 microfarads, respectively.

A multiplier switch 30 is arranged selectively to connect one or another of the capacitors 27, 28 and 29 (1) to the movable contact 31 of a charge and discharge switch 32 and (2) through a current limiting resistor 33 to the grid 34 of the device 26.

The charge and discharge switch 32 has a fixed contact 35 which is connected to the negative lead 22 and a fixed contact 36 which is connected through a selected part of a resistor 37 and a movable contact arm 38 to the positive lead 20.

The positive lead 20 also is connected through the operating coil 39 of a relay 40 and a start cycle switch 41 to the anode 42 of the device 26. As hereinafter explained, the switch 41 is operated, thus starting the operating cycle of the timing device.

Load devices, represented by utility outlets or receptacles 43 and 44, are arranged to be connected across the primary winding 11 alternatively through a movable switch contact 45 and a fixed contact 46 or a fixed contact 47.

The normal or standby condition of the timing device is indicated by the following items numbered (1) to (5):

(1) Switch 41 is maintained closed,
(2) Device 26 is conducting,
(3) Relay 40 is energized,
(4) Switch blade 31 engages contact 35, and (5) The plate of capacitor 28 which is connected to the grid 34 of the device 26 is charged to a negative potential relative to ground.

The operating cycle of the timing device is indicated by the following items (6) to (14):

(6) Switch 41 is operated, opening the circuit during its transit time, (7) Device 26 is made non-conductive, (8) Relay 40 is deenergized.

(9) Switch blade 31 engages contact 36, starting the time interval,

(10) Capacitor 28 discharges through selected part of resistor 37 and movable contact 38 to critical grid voltage of device 26,

(11) Device 26 starts to conduct,

(12) Relay 40 is energized,

(13) Switch blade 31 engages contact 35 ending time interval, and

(14) Capacitor 28 is charged to a negative potential.

It will be noted that the switch blades 31 and 45 are ganged together, as indicated by a broken line 46, so as to be operated to their lower contact position by the movable element of the relay 40 when this relay is energized. From this it follows that power is supplied to receptacle 44 and power is removed from receptacle 43 during the time interval between starting of the discharge of the capacitor 28 and attainment of the critical grid voltage by which discharging of the capacitor 28 is interrupted.

As indicated by Fig. 2, this time interval is unaffected by variation in the voltage applied to the primary winding 11 of Fig. 1. In Fig. 2, $E_2$ represents the voltage between the leads 20 and 14 (Fig. 1) and $E_1$ represents the voltage between the leads 22 and 14. The discharge curve of the capacitor 28 is derived by plotting voltage against time. It is well known that $$\frac{E_2}{E_1} = \frac{1}{2} = \epsilon^{\frac{-t}{RC}}$$

Hence,
$$t = 0.693RC$$

where
$t$ is in seconds,
$R$ is in megohms, and
$C$ is in microfarads.

The potentiometer 37—38 includes ten resistor elements each of 360,000 ohms. With the multiplier switch blade 30 connected to the capacitor 28, time intervals of a range from 1 to 10 seconds may be selected. With the switch blade 30 connected to the capacitor 27, time intervals of a range from 0.1 to 1 second may be selected. With the switch blade connected to the capacitor 29, time intervals of a range from 10 to 100 seconds may be selected.

The present invention thus provides a timing device which (1) operates independently of variations in line voltage and (2) provides time intervals in steps of 0.1 second up to 1 second, in steps of 1 second from 1 second to 10 seconds, and in steps of 10 seconds from 10 to 100 seconds. It is, of course, apparent that any suitable load devices may be connected to the receptacles 43 and 44 and that the gaseous conduction device 26 may be replaced by any equivalent device which is made non-conductive by momentary interruption of its operating potential and is made conductive when its control potential changes to a predetermined value intermediate those of the negative and positive components. It is also apparent that the minimum timing interval may be reduced considerably, depending only on the maximum speed of operation of the relay 40.

What is claimed is:

1. The combination of means for applying a resultant potential having positive and negative components, a relay, an energizing circuit for said relay, a resistor, a capacitor, circuit control means operable to apply said negative component to said capacitor in response to energization of said relay and to apply said positive component through said resistor to said capacitor in response to deenergization of said relay, and means operable to deenergize said relay only while the charge of said capacitor is within a range extending from its most negative value to approximately zero.

2. The combination of means for applying a resultant potential having positive and negative components, a relay, an energizing circuit for said relay, a resistor, a capacitor, circuit control means operable to apply said negative component to said capacitor in response to energization of said relay and to apply said positive component through said resistor to said capacitor in response to deenergization of said relay, means operable to deenergize said relay only while the charge of said capacitor is within a range extending from its most negative value to approximately zero, a load device, and means operable to energize said load device only while the charge of said capacitor is within said range.

3. The combination of means for applying a resultant potential having positive and negative components, a relay, an energizing circuit for said relay, a resistor, a capacitor, circuit control means operable to apply said negative component to said capacitor in response to energization of said relay and to apply said positive component through said resistor to said capacitor in response to deenergization of said relay, means operable to deenergize said relay only while the charge of said capacitor is within a range extending from its most negative value to approximately zero, a load device, and means operable to deenergize said load device only while the charge of said capacitor is within said range.

4. The combination of means for applying a resultant potential having positive and negative components, a relay, an energizing circuit for said relay comprising a gaseous conduction device provided with a control grid and an anode and cathode and connected to have said positive component applied through said relay between its anode and cathode, a capacitor connected between said cathode and grid, means for interrupting the current of said gaseous conduction device, a resistor, and circuit control means responsive to operation of said relay for applying said negative component to said capacitor in response to current conduction of said gaseous conduction device and for applying said positive component through said resistor to said capacitor in response to interruption of said current conduction.

5. The combination of means for applying a resultant potential having positive and negative components, a relay, a gaseous conduction device provided with a control grid and an anode and cathode and connected to have said positive component applied through said relay between its anode and cathode, a capacitor connected between said cathode and grid, means for interrupting the current of said gaseous conduction device, a resistor, circuit control means responsive to operation of said relay for applying said negative component to said capacitor in response to current conduction of said gaseous conduction device and for applying said positive component through said resistor to said capacitor in response to interruption of said current conduction, a load device, and means for energizing said load device only during non-conduction of said gaseous conduction device.

6. The combination of means for applying a resultant potential having positive and negative components, a relay, a gaseous conduction device provided with a control grid and an anode and cathode and connected to have said positive component applied through said relay between its anode and cathode, a capacitor connected between said cathode and grid, means for interrupting the current of said gaseous conduction device, a resistor, circuit control means responsive to said relay for applying said negative component to said capacitor in response to current conduction of said gaseous conduction device and for applying said positive component through said resistor to said capacitor in response to interruption of said current conduction, a load device, and means for deenergizing said load device only during non-conduction of said gaseous conduction device.

7. The combination of means for applying a resultant potential having positive and negative components, a relay, an energizing circuit for said relay, a resistor adjustable in ten equal steps, capacitance means adjustable in steps increasing by multiples of ten, circuit control means operable to apply said negative component to said capacitance means in response to energization of said relay and to apply said positive component through said resistor to said capacitance means in response to deenergization of said relay, and means operable to deenergize said relay only while the charge of said capacitance means is within a predetermined range starting at its most negative value and ending approximately at its zero value.

8. In a timing circuit, in combination, opposite polarity unidirectional potential sources, a capacitor, a circuit including a switch normally connecting said capacitor to one of said potential sources to charge said capacitor to the voltage of said one source, a resistor, means for actuating said switch to disconnect said capacitor from said one voltage source and to connect said capacitor to the other of said voltage sources through said resistor to cause the voltage on said capacitor to begin to change from that of said first source to that of said second source, and means connected to said capacitor for actuating said switch to reestablish said circuit from said one source to said capacitor in response to a predetermined change in the voltage across said capacitor.

9. A circuit as defined in claim 8 including a load device, an energizing source, and means responsive to actuation of said switch to connect said load device to said energizing source only while said capacitor is connected to said other of said voltage sources.

10. A circuit as defined in claim 8 wherein said first named means comprises a relay having an operating coil and having a movable element connected to said switch, a gaseous conduction device having a control grid and a cathode, an energizing circuit for said device including said relay operating winding, and a switch for interrupting said energizing circuit.

11. A circuit as defined in claim 10 wherein the last named means of claim 8 comprises said relay, said gaseous conduction device, said energizing circuit, and connections from said capacitor to said control grid and said cathode.

12. A timing circuit comprising, in combination, first and second serially connected capacitors, means connected to charge said capacitors with voltages of opposite polarity, a third capacitor, a first circuit normally connecting said third capacitor in parallel with said first capacitor, a switch, means to actuate said switch to disconnect said third capacitor from said first capacitor and to connect said third capacitor in series with said resistor and said first and second capacitors, and means to actuate said switch, in response to a predetermined change in the voltage across said third capacitor, to reestablish said first circuit.

SIDNEY WALD.
JOHN S. RUSSO.

No references cited